Nov. 7, 1967  J. T. C. HARVEY  3,351,320
SYSTEM FOR SECURING WIRES IN A STRESSED CONDITION
Filed March 3, 1967  6 Sheets-Sheet 1

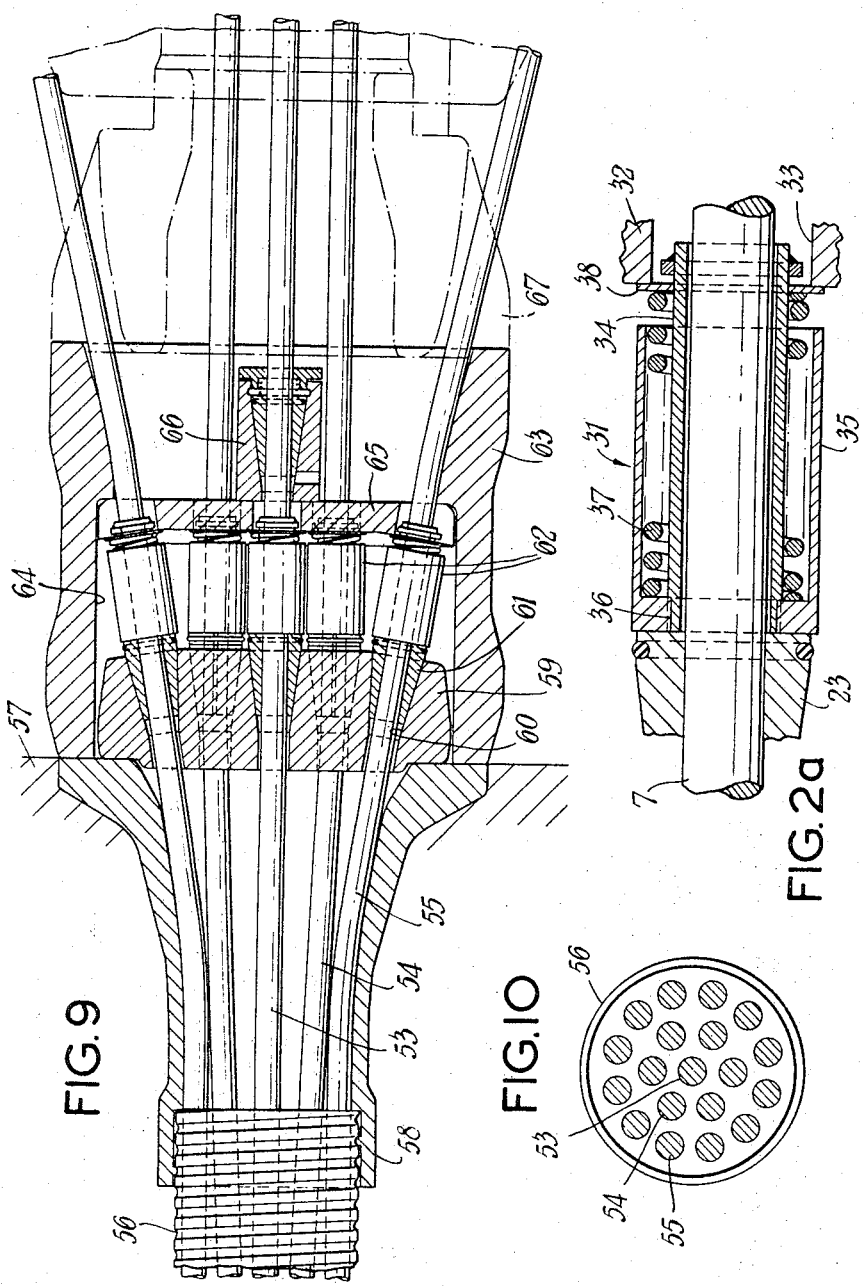

United States Patent Office 3,351,320
Patented Nov. 7, 1967

3,351,320
SYSTEM FOR SECURING WIRES IN A STRESSED CONDITION
John T. C. Harvey, Beaconsfield, Buckinghamshire, England, assignor to P.S.C. Equipment Limited, Iver, Buckinghamshire, England, a British company
Filed Mar. 3, 1967, Ser. No. 620,440
Claims priority, application Great Britain, Mar. 31, 1966, 14,329/66
9 Claims. (Cl. 254—29)

ABSTRACT OF THE DISCLOSURE

A system of prestressing wires in concrete structures by passing the wires through a funnel-shaped anchorage guide embedded in the concrete and through an anchorage block having individual permanent gripping devices for the wires; and a jack bearing against the anchorage block, a central group of the wires passing centrally through the jack and being temporarily gripped by gripping devices at the rear of the jack and a peripheral group of the wires diverging and being temporarily gripped by gripping devices on the outer wall of the jack.

This invention relates to a system for securing wires in a stressed condition and in particular to apparatus for securing a tendon of wires in a stressed condition within a structure which may be of concrete, ceramics, metal, wood or plastics. In this specification the term "wire" includes single wires which may be made out of metal, glass fibre or plastics and also strands made up from a plurality of wires or rods spiralled together in the manner of a steel rope. Also in this specification, the term "tendon" means a number of wires which run substantially parallel to each other and are spaced slightly apart in the structure, possibly by the use of spacers.

Apparatus for pre-stressing wires in concrete structures, for example, buildings and bridges, basically includes an anchorage guide embedded in the concrete at one or both end of the tendon, the wires passing out of the concrete through these anchorage guides; an anchorage block covering the open end of each anchorage guide, each anchorage block having apertures therein through which single wires pass; grippers located in the apertures, each gripper surrounding a wire to hold it in its stressed condition and a jack for stressing the wires to the required degree individually. A tendon is separated from the concrete by passing within a sheath, or the tendon is located externally of the concrete or within a duct or groove formed in the concrete in the case of precast concrete constructions.

In another known form of apparatus, the anchorage block takes the general form of a truncated cone, which acts as a male member received within a complementary part of the anchorage guide which acts as a female member, the cooperating surfaces of one or both members having radiused grooves which receive the wires and the male member acting as a wedge to retain the wires in a stressed condition.

Such systems are eminently suitable where a reasonably small number of wires are involved, for example, up to a maximum of twelve wires forming each tendon. However, in the construction of very large structures and in particular in long bridges or pressure vessels in power stations, the number of wires it is necessary to include in each is correspondingly increased from twelve to well over fifty in each tendon. Normally accepted systems cannot technically or economically be extended to cope with such a large number of wires.

It is the main object of this invention to provide a system and apparatus for securing a comparatively large number of wires in the stressed condition.

According to the present invention there is provided apparatus for securing a tendon of wires in a stressed condition within a structure, including a funnel-shaped anchorage guide embedded in the structure; an anchorage block bearing on the anchorage guide, the tendon passing through the anchorage guide and each wire of the tendon passing through a hole in the anchorage block; permanent gripping devices associated with the anchorage block each for holding an associated wire in a stressed condition and a jack bearing against the anchorage guide or anchorage block; wherein the jack has means which define an inner aperture axial of the jack through which passes a central group of wires of the tendon and temporary gripping means disposed at the rear of the inner aperture for gripping the central group of wires; the jack also having further means which define outer apertures on the outer wall of the jack, each such outer aperture receiving one of a peripheral group of wires of the tendon and further temporary gripping means associated with each such outer aperture for gripping a wire of the peripheral group of wires.

Two embodiments of apparatus constructed in accordance with the invention will now be described, by way of example only, and with reference to the accompanying drawings, in which:

FIG. 2a is a detailed longitudinal sectional view of a component generally illustrated in FIG. 2 namely, a resilient device;

FIG. 9 is a longitudinal sectional view of part of apparatus of a further embodiment constructed in accordance with the invention;

FIG. 10 is a cross-sectional view of a tendon comprising nineteen wires and illustrating the disposition of the wires in a tendon.

Figures 1, 2:
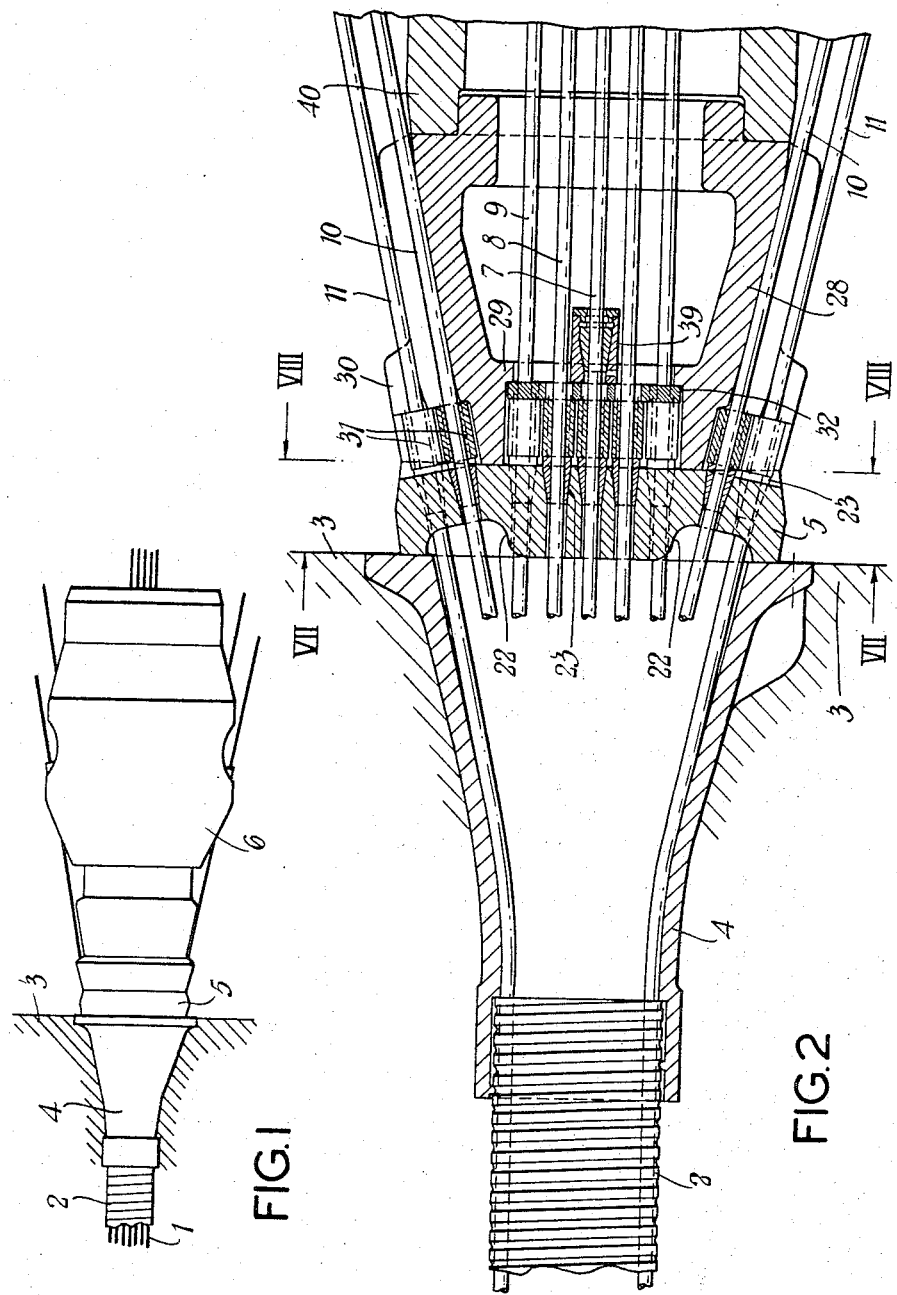
FIG. 1 is a diagrammatic side elevation of apparatus constructed in accordance with the invention.
FIG. 2 is a longitudinal sectional view of part of the apparatus of FIG. 1 namely, an anchorage and part of a jack.
Figure 3:
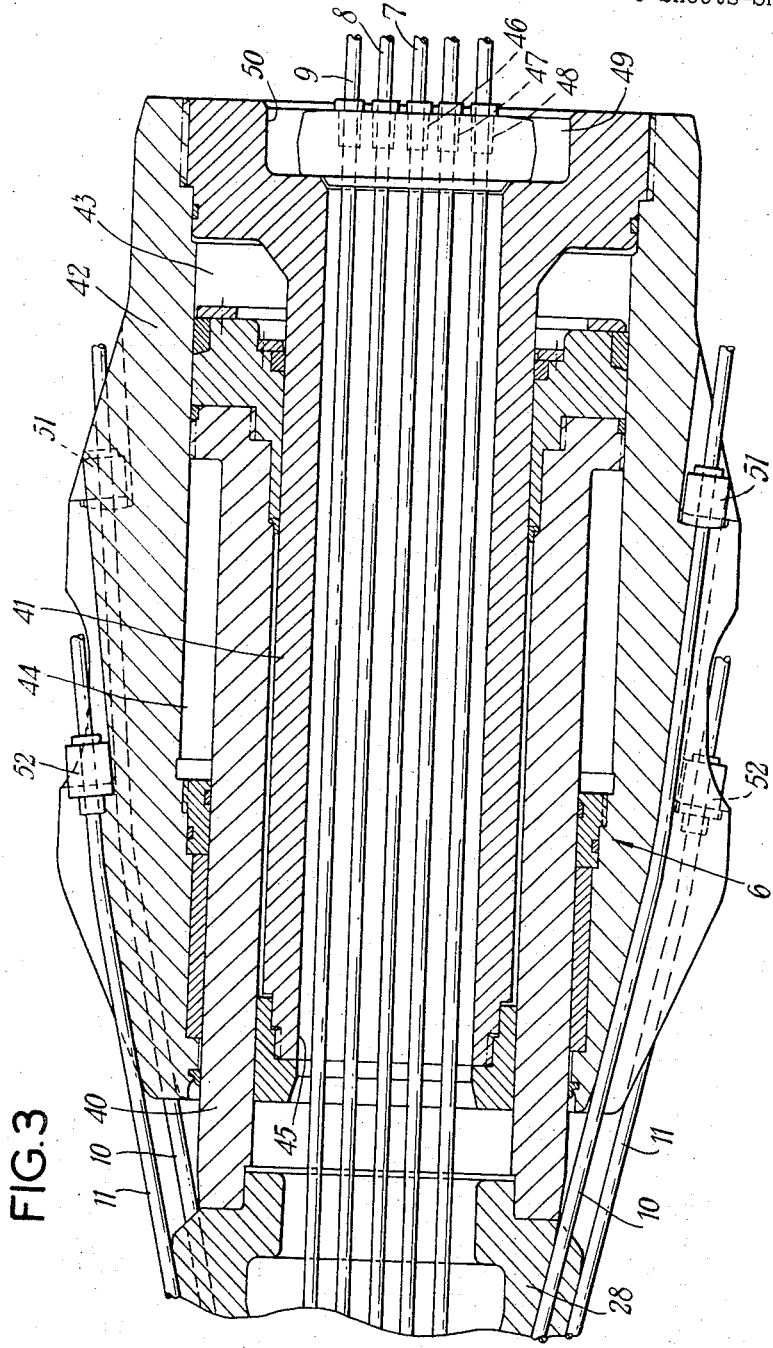
FIG. 3 is a longitudinal sectional view of a component generally illustrated in FIG. 1, namely a jack.
Figure 4:
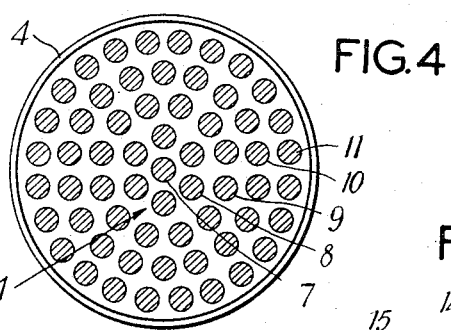
FIG. 4 is a cross-sectional view of a tendon indicating the disposition of the sixty-one wires thereof.

Referring first of all to the embodiment illustrated in FIGS. 1 to 8 which is to stress and anchor a tendon comprising sixty-one wires in the disposition illustrated in FIG. 4, it will be seen from FIG. 1 that a tendon 1 consisting of sixty-one wires lies within a sheath 2, thus separating the tendon from a concrete structure 3, the wires within the tendon 1 being substantially parallel to each other. The opposite end of a tendon may rotate about the axis of the tendon, but individual wires should be prevented from changing places by crossing over each other. At each end of the tendon 1 is an anchorage guide 4 so that a jack to extend the wires can be used at each end, the necessary extension of a wire at each end being approximately half the total extension. However, the system at only one end will be described, it being appreciated that the system may be duplicated at the other end. There may be occasions, of course, in which the structure is small enough for the wires to be anchored at one end and extension carried out only at the other end, and the present invention is not restricted to a system in which extension takes place at both ends of the wires. When the extension is carried out at one end only, the use of an anchorage as to be described hereafter is not obligatory at the other end and any other suitable type of anchorage can be employed there.

Bearing against the anchorage guide 4 is an anchorage block 5 and bearing against the anchorage block 5 is a jack 6 each of which will be described in detail later.

The disposition of the wires which form the tendon 1 are illustrated in FIG. 4, in which it will be seen that there is a central wire 7, next a ring of six wires 8, next a ring of twelve wires 9, then a ring of eighteen wires 10 and finally an outer ring of twenty-four wires 11.

Figure 5:
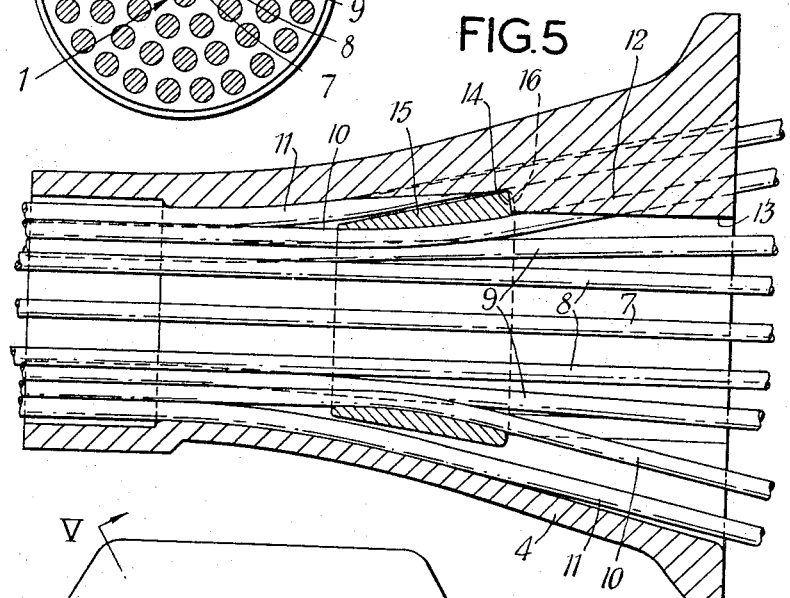
FIG. 5 is a longitudinal sectional view of a component generally illustrated in FIGS. 1 and 2, namely an anchorage guide, taken on the line V—V of FIG. 6.
Figure 6:
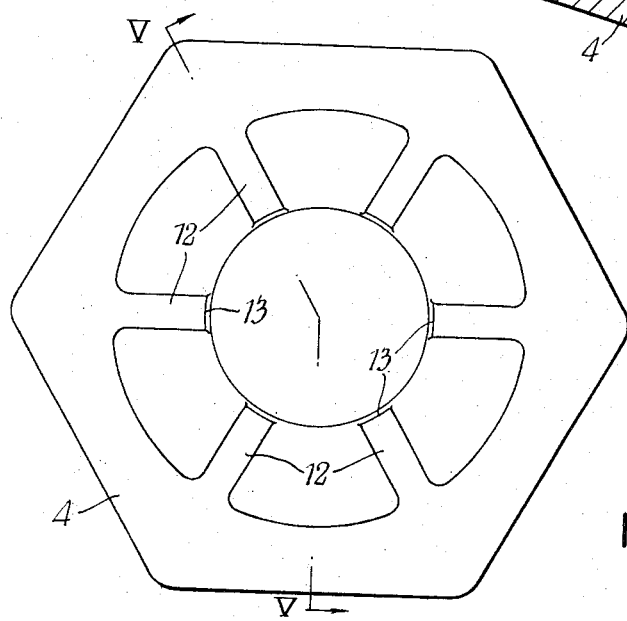
FIG. 6 is an end elevation of the anchorage guide illustrated in FIG. 5 with the wires omitted for clarity.

The anchorage guide 4, as seen in detail in FIGS. 5 and 6, does not have a male cooperating component but practically all the available space within the anchorage guide 4 is utilised for the passage of wires. These wires are divided into two categories, namely, those which pass substantially straight through the anchorage guide substantially parallel with the axis of the guide, these being the central wire 7 and the inner rings of wires 8 and 9; and those which diverge from the axis of the anchorage guide as they emerge from the concrete structure, these being the two outermost rings of wires 10 and 11. Thus, there are nineteen wires passing straight through the guide and forty-two wires diverging.

The anchorage guide 4 is provided with equally spaced radial internal ribs 12 extending longitudinally of the anchorage guide with the inner edges 13 of the ribs 12 parallel with the axis of the anchorage guide. The function of these ribs 12 is to transmit directly to the anchorage guide 4 the pressures exerted from the anchorage block 5 during stressing of the wires and thereafter and to keep the anchorage block in low flexural stress. Each rib 12 has an abutment 14 facing the narrow end of the anchorage guide lying within the concrete structure. A loose frusto-conical insert 15 lies within the anchorage guide 4 with its broad end against the abutments 14. To position the insert 15 within the anchorage guide 4, the insert 15 has external grooves of a width slightly greater than the thickness of the ribs 12, these grooves being spaced in accordance with the spacing of the ribs 12 and the depth of the grooves being such that the radius of the insert to the bottom of a groove is slightly less than the radius of a rib 12 from the axis of the anchorage guide 4. This arrangement enables the grooves of the insert 15 to be registered with the ribs 12 of the anchorage guide 4 and the insert 15 pushed into the guide behind the abutments 14. The insert may then be turned slightly about its axis so that it stays within the guide 4. The abutment 14 of the ribs 12 may be recessed at 16, these recesses receiving protuberances on the insert 15 so as to prevent the grooves of the insert 15 again registering with the ribs 12 of the guide and the insert 15 moving out of position during the assembly of the anchorage.

The purpose of insert 15 is to guide the ring of wires 10 as they pass through the anchorage guide 4. The outermost ring of wires 11 lies between the inner wall of the anchorage guide 4 and the outer surface of the insert 15 and the second outermost ring of wires 10 lies within the insert 15. The insert thus divides the two outermost rings of wires 10 and 11.

In the case of tendons with a smaller number of wires, a frusto-conical insert in the anchorage guide may not be necessary.

Figure 7:
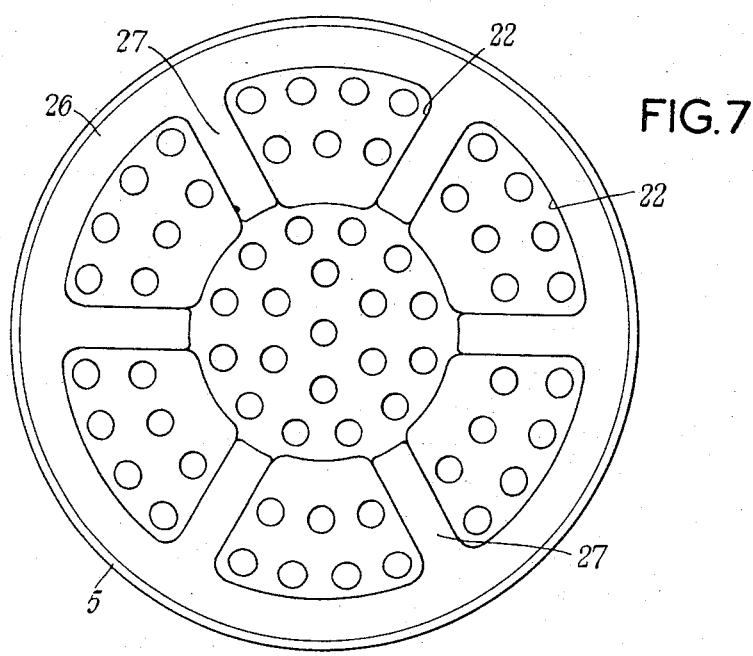
FIG. 7 is an end elevation, taken on the line VII—VII of FIG. 2.
Figure 8:
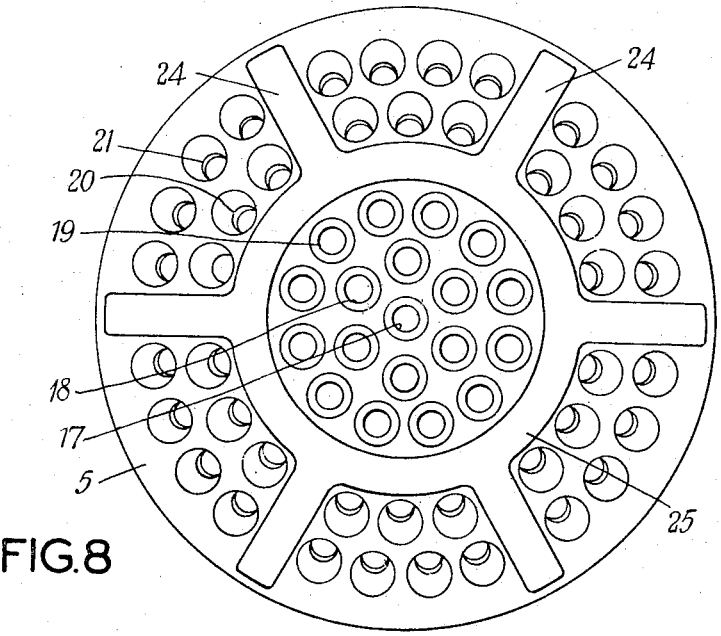
FIG. 8 is an end elevation, taken on the line VIII—VIII of FIG. 2.

Covering the open end of the anchorage guide 4 is an anchorage block 5, two end views of which are shown in FIGS. 7 and 8. This anchorage block 5 will form a permanent part of the structure. The anchorage block 5 has sixty-one apertures therein, appropriately distributed each to receive one of the wires emerging from the anchorage guide 4. A central aperture 17 and the innermost rings of apertures 18 and 19 will be parallel with the axis of the block 5 whereas the other rings of apertures 20 and 21 are inclined to the axis of the block 5 so that the diverging wires will readily pass therethrough. The wires in ring 19 may diverge very slightly as they leave the anchorage guide 4 and therefore the apertures 19 may accordingly only be very slightly offset from the axis of anchorage block 5. There are annular recesses 22 in the rear face of the anchorage block 5 and the two outermost rings of apertures 20 and 21 emerge into these recesses 22 which enable the wires in rings 20 and 21 to be passed more easily into their appropriate apertures. Each aperture is tapered for part of its length, the largest diameter of each aperture being where it emerges on the front face of the block, as seen in FIG. 8. Each tapered part of an aperture is for the reception of grippers 23 known per se which retain the wires in their extended condition and form a permanent part of the structure.

The front face of the anchorage block 5, as seen in FIG. 8, is provided with outward radial flats 24 from a circular flat 25 so that a jack abutting the flats may exert a pull on a wire along the axis of the tendon as it emerges from the anchorage block. The radial flats 24 are in line with the ribs 12 of the anchorage guide 4. The rear face of the anchorage block 5, as seen in FIG. 7, has an annular surface 26 from which extend inward radial short ribs 27 of similar pattern to the ribs on the anchorage guide 4. Thus the flats 24, the ribs 27 and the ribs 12 are all in line axially of the system.

All that has now been described forms a permanent part of the structure and the following description is of the apparatus which performs the stretching of the wires.

The jack 6 is provided with a foot 28 (see FIG. 2) which bears on the machined flats 24 and 25 of the anchorage block 5. The central parallel wires 7, 8 and 9 pass through the foot and the diverging wires 10 and 11 pass around the foot. Located between a wall 29 or a wall 30 and the permanent grippers 23 are resilient devices 31 for urging the grippers 23 into their tapered apertures. One of these resilient devices is shown in detail in FIG. 2a.

Referring to FIGS. 2 and 2a, a pressure plate 32 abuts the wall 29 and this pressure plate 32 has apertures 33 therein through which pass the wires, for example, wire 7. The resilient device 31 includes an inner cylinder 34 and an outer cylinder 35 fixed to the inner cylinder at 36. Between the two cylinders is a spring 37 which at its rear end abuts a washer 38 bearing against the pressure plate 32. The spring 37 is under compression so as to urge the grippers 23 into their tapered apertures. It will be appreciated that because one end of a resilient device abuts a gripper 23, whenever the gripper 23 moves slightly out of its aperture during extension of the wire, the resilient device 31 will force the gripper back again into its aperture. This will continue until full extension is achieved, whereupon the jack foot and the resilient means will be removed.

During positioning of the jack, the pressure plate 32 and the resilient means 31 surrounding the central group of wires 7, 8 and 9, are held in place by an auxiliary gripper 39 located on one of the wires, for example, wire 7. This gripping device 39 is of a type known per se.

The jack 6 is illustrated in more detail in FIG. 3 and, as already mentioned, includes a jack foot 28 and a cylindrical stationary piston 40 which abuts the foot and inner and outer cylindrical tubes 41 and 42 respectively which move in unison relative to the stationary piston 40. Extension and retraction of the jack 6 is achieved by oil pressure being admitted to chambers 43 and 44 respectively.

The central parallel group of wires 7, 8 and 9 pass through central aperture 44 of the jack and the diverging wires 10 and 11 pass around the jack. All the wires are held by temporary means, for example, by temporary grippers similar to the permanent grippers mentioned above, which temporary grippers are located in suitably tapered holes. For the central group of wires 7, 8 and 9, the temporary grippers are indicated at 46, 47 and 48 respectively, located in tapered apertures within block 49 at the rear end of the central aperture 45, the block 49 being located within recess 50. The two diverging rings of wires 10 and 11 are held by individual grippers 51 and 52 respectively located in apertures in the outer wall of the jack.

In use, the cylindrical stationary piston 40 abuts to and thrusts against the jack foot 28. All the diverging wires 10 and 11 are tensioned by the axial outward movement of the external tube 42 of the jack 6 and all the internal parallel wires 7, 8 and 9 are simultaneously tensioned by similar axial movement of the internal cylindrical tube 41 of the jack. Oil pressure fed to chamber 43 to extend the jack, causes the inner and outer cylindrical parts 41 and 42 to move in unison relative to the stationary piston 40, thus extending all the wires simultaneously.

It will be appreciated that the above described jack, although capable of extending sixty-one wires simultaneously may be used for extending a smaller number of wires, for example, thirty-seven from which the outer ring of twenty-four wires is omitted.

Figure 11:
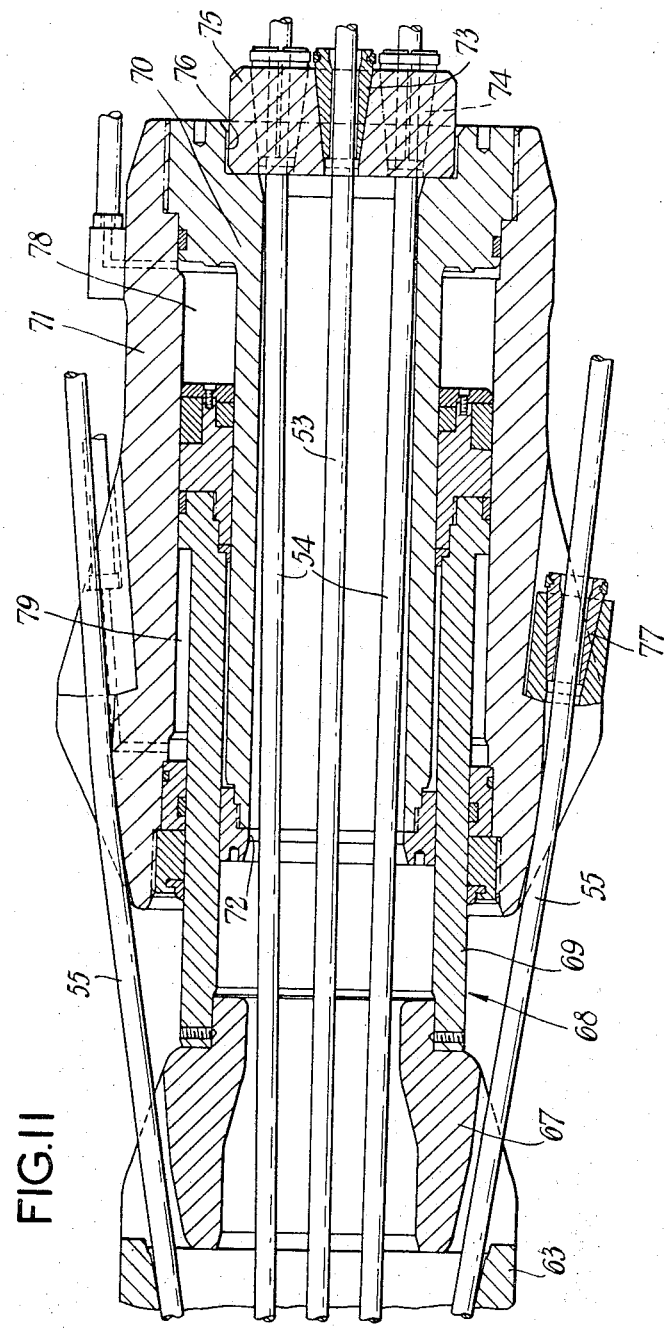
FIG. 11 is a longitudinal sectional view of a further part of apparatus of the further embodiment.

A further apparatus in accordance with the invention will now be described in connection with FIGS. 9 to 11. This apparatus functions very similarly to the function above described in relation to the extension of a tendon having sixty-one wires, but in this particular embodiment the tendon comprises nineteen wires as illustrated in FIG. 10. The tendon consists of a central wire 53, next a ring of six wires 54, and an outer ring of twelve wires 55 encased in a sheath 56 which lies within a concrete structure 57.

An anchorage guide 58 is embedded in the concrete and this anchorage guide is funnel shaped as before but may have no internal ribs and will not have a frusto-conical insert. An anchorage block 59 is provided at the outer end of anchorage guide 58 and the anchorage block 57 has nineteen apertures therein, through which the wires of the tendon pass. Each aperture 60 of the anchorage block is tapered for part of its length to receive permanent grippers 61 which are held in place by resilient means 62 which are of the same form as that illustrated in FIG. 2a. A stressing adaptor 63 bears against the anchorage guide 58 and the stressing adaptor 63 is provided with a recess 64 which receives the anchorage block 59 and the resilient means 62 and also a pressure plate 65. An auxiliary gripping device 66 retains the resilient means 62 and the pressure plate 65 in position while the stressing adaptor and the jack are positioned. This auxiliary gripping device 66 is located on the central wire 53. Here again, the resilient devices 62 will be under predetermined compression when in position.

Bearing against the stressing adaptor 63 is a jack foot 67 and bearing against the jack foot 67 is a jack 68. The jack 68 includes a cylindrical stationary piston 69 and inner and outer cylindrical tubes 70 and 71. The inner cylindrical tube 71 defines a central aperture 72 through which the central wires 53 and 54 pass to be held by temporary gripping devices 73 and 74 respectively in a block 75 within recess 76 at the rear end of central aperture 72. The diverging group of wires 55 are held by temporary gripping devices 77 which engage in outer apertures on the outer wall of the jack.

Oil pressure fed to chamber 78 extends the jack for stressing the wires and oil pressure fed to chamber 79 retracts the jack.

It will be appreciated that in order fully to tension a tendon in one operation a jack of sufficient force capacity must be used. However, the size, weight and cost of such a jack may make this single operation impossible or economically not viable in certain cases. Under these conditions, it may be desirable to tension the tendon using a lighter, smaller and less expensive jack by tensioning groups of wires in the tendon successively. For example, a tendon of nineteen wires may be tensioned in three operations of seven, six and six wires with a jack whose force rating does not exceed that for seven wires. Under these circumstances, it is desirable that wires moving as a group should be separated from other groups which remain static during that part of the tensioning operation and thus spacers may be provided on the tendon. This is possible because each wire is gripped individually and independently of all other wires of the tendon.

Although two systems have been above described in relation to tendons having sixty-one and nineteen wires respectively, it will be appreciated that the system of the invention is equally applicable to extending tendons having any number of wires, the extension of the wires in each tendon being achieved either collectively or in groups.

The anchorage guide having a suitable bearing surface may bear upon the outer surface of the concrete structure instead of being embedded therein as above-mentioned.

I claim:
1. Apparatus for securing a tendon of wires in a stressed condition within a structure, including a funnel-shaped anchorage guide cooperating with the structure; an anchorage block bearing on the anchorage guide, the tendon passing through the anchorage guide and each wire of the tendon passing through a hole in the anchorage block; permanent gripping devices associated with the anchorage block each for holding an associated wire in a stressed condition and a jack bearing against the anchorage; wherein the improvement comprises means within the jack which defines an inner aperture axial of the jack through which passes at least one central wire of the tendon and temporary gripping means disposed towards the rear of the inner aperture for gripping the central wire or wires; further means on the jack which defines outer apertures on the outer wall of the jack, each such outer aperture receiving one of a peripheral group of wires of the tendon and further temporary gripping means associated with each such outer aperture for gripping a wire of the peripheral group of wires.

2. Apparatus as claimed in claim 1, wherein the improvement further comprises the provision of resilient means bearing on each permanent gripping device to keep the permanent gripping devices in position during a stressing operation.

3. Apparatus as claimed in claim 1, wherein the improvement further comprises internal radial ribs in the anchorage guide which bear against the anchorage block.

4. Apparatus as claimed in claim 3, wherein the improvement further comprises the anchorage block having flat radial surfaces which bear against the ribs of the anchorage guide.

5. Apparatus as claimed in claim 3, wherein the improvement further comprises the co-operating faces of the anchorage block and jack having registering bearing surfaces which are axially in line with the ribs of the anchorage guide.

6. Apparatus as claimed in claim 3, wherein the improvement further comprises an apertured frusto-conical insert which bears against an abutment of each of the said ribs of the anchorage guide to assist in guiding the peripheral group of wires of the tendon.

7. Apparatus as claimed in claim 1, wherein the improvement further comprises the jack having a sufficient force rating to tension the whole tendon simultaneously.

8. Apparatus as claimed in claim 1, wherein the improvement further comprises the jack having a sufficient force rating only to tension a group of wires in the tendon and completes the tensioning in more than one operation.

9. Apparatus as claimed in claim 8, wherein the improvement still further comprises the tendon being provided with spacers to allow each group of wires to move independently during the tensioning operation.

References Cited

UNITED STATES PATENTS

| 2,637,895 | 5/1953 | Blaton. | |
|---|---|---|---|
| 2,768,810 | 10/1956 | Bouvy et al. | 254—29 |
| 3,176,961 | 4/1965 | Glass | 254—29 |

FOREIGN PATENTS

| 772,858 | 4/1957 | Great Britain. |
|---|---|---|
| 775,744 | 5/1957 | Great Britain. |

MILTON S. MEHR, *Primary Examiner.*